INVENTOR.
WILLIAM L. STILL
BY
Nolte & Nolte
ATTORNEYS

United States Patent Office 3,398,356
Patented Aug. 20, 1968

3,398,356
METHOD UTILIZING A PAIR OF SUBSURFACE ANTENNAS FOR DETERMINING THE PHYSICAL PROPERTIES EFFECTING RADIO ENERGY PROPAGATION THROUGH EARTH
William L. Still, Lovettsville, Va., assignor, by mesne assignments, to Westinghouse Electric Corporation, Pittsburgh, Pa., a corporation of Pennsylvania
Filed Feb. 10, 1964, Ser. No. 343,888
6 Claims. (Cl. 324—6)

ABSTRACT OF THE DISCLOSURE

Method for obtaining a representation of the characteristics of the propagating path between spaced antennas within the earth, one antenna located from and below the other. Radio energy propagating almost vertically downward in the earth is received by each antenna and compared. The electrical characteristics of the propagating path between said antennas are reproduced in response to the comparison to simulate the physical properties of the earth between and in the vicinity of the antennas.

---

This invention relates to a method and device for determining the physical constants which affect the propagation of radio energy through the earth.

After radio waves have been radiated from a source of electromagnetic energy, they propagate in the air over the surface of the earth. As they propagate, they are refracted according to physical laws. The contrast between the air and the earth is so great that the angle of refraction is equal to almost ninety degrees. Thus, regardless of the direction of arrival of electromagnetic energy at a point on the surface of the earth, the energy propagating within the earth can, over a very wide range of frequencies, be considered as propagating vertically downward from that point.

As radio waves propagate through any medium, their strength is affected by many factors. These include among others, permeability, permittivity, and resistivity of the propagating medium. In general, these three characteristics define the tendency of the medium to store electromagnetic and electrostatic energy, and convert either electromagentic or electrostatic energy into heat.

The medium which supports radio propagation between two or more points can be expressed by analogy as a passive electrical circuit consisting of energy storage and dissipation devices such as a combination of inductors, capacitors and resistors. Such a path can be simulated by any of numerous active or passive mechanical, electrical, electromechanical or numerical computational devices which are known and conventionally used to simulate such electrical circuits. This would also include devices which simulate the characteristics of other phenomena which can in themselves be expressed by analogy in the form of such circuits.

Conversely if such a path were accurately simulated by a device, the measurement or determination of the characteristics of that device provides a means of defining, through either direct interpretation or calculation, the permeability, permittivity (which is sometimes called dielectric constant) and resistivity, and/or conductivity of that path. This of course assumes that other factors affecting propagation over that path are properly taken into account.

The main object of this invention is to provide a method and apparatus for determining the physical constants of the earth.

An object of the invention is to provide a method and apparatus for determining the physical constants or properties of the earth between and in the vicinity of two points which are substantially one above the other.

Another object is to provide a method and apparatus for determining the physical constants of the earth without the need of a particular radio transmitter.

Except where specifically redefined, the term "measurement" is intended herein to mean the measurement of the difference between two or more signals within the earth, wherein the points of measurement are located substantially in a line which is vertical with respect to the surface of the earth. This restriction is to enable exploitation of the unidirectional characteristics of propagation within the earth of signals generated above the surface of the earth regardless of their direction of arrival at a point on the surface above the point of measurement.

Except where a unique characteristic is involved, the measurement of the physical constant of the propagation path herein means the measurement of the characteristics of the propagation path. Thus, the characteristics which are measured are referred to as physical constants. Simulation means the operations of physical simulation and mathematical computation, which produces results equivalent to physical simulation, and any means which substantially reproduces the characteristics of the propagation medium should be considered as simulating the medium.

When radio waves penetrate the earth, the earth itself becomes the propagation medium and the physical constants which are unique to the rocks, water and minerals within the earth define the behavior of these radio waves. The only way the direction of propagation of these waves can be changed from a substantially vertically downward direction is for there to exist within the earth a discontinuity in the physical constants of the earth which will cause further refraction or reflection of these waves. Thus, the measurement of the behavior of these waves as they propagate through the earth provides a means of measuring the physical constants involved, which, in accordance with the definition of measurement of physical constants, could include such anomalous conditions as reflections or scattering from ore bodies in the vicinity of the points of measurement. In turn, this provides a means of determining, inferring or deducing the minerals, lithology and geophysical characteristics in the vicinity of the measurement points, and the intervening path. Such a device would be a valuable aid in many areas of mineral and geophysical prospecting, and exploration, as well as to scientific investigation and underground radio communication.

The invention utilizes electromagnetic energy for the above purpose without being limited to the use of manmade radio signals. In general, the invention determines the physical constants which affect radio propagation between two points, one directly above the other, both of which are below the surface of the earth, by the use of radio or electromagnetic signals which already exist, whether natural or man-made, such as distant atmospheric noise or radio transmitters. No special radio transmitter is needed.

The invention consists of a system wherein radio energy is received at the first of two antennas and continues downward propagation through the earth until received by the second antenna. As the energy propagates, its form or spectrum is modified by the physical constants of the propagating medium. Thus, the energy which is received by the second antenna will differ from that received by the first antenna in a manner which is unique to the medium and propagation path involved. The energy received by the first antenna is modified by a circuit, or a computer, the parameters of which can be varied to simulate the propagation medium. The output of the simulation circuit is compared with the energy received by the second antenna, and the parameters of the simulation circuit or computer are varied until the two outputs are substantially the same over the frequency range of interest. When these conditions occur, the simulation circuit or mathematical model is a true representation of the specific propagation medium involved. The physical constants involved as they affect the path can then be determined.

Another feature of this invention is the discovery that the factors which affect the act of cancellation are unique to the characteristics of the propagating medium and path, and not to the characteristics of the signals used or cancelled. Thus, random noise from atmospheric disturbances such as distant lightning strikes can be completely cancelled out. More important is the fact that in cancelling this random energy, the characteristics of the medium become defined in the cancellation device. Hence, the entire frequency spectrum of freely available energy from the atmosphere, whether natural or man-made, can be used as a power source for such processes as geophysical exploration and mineral prospecting. Up to the time of this invention, atmospheric noise has been one of the limiting factors in measurements at the frequencies of interest. By using this noise as a power source, this invention opens the way for probing to great depths beneath the earth's surface, without the need to generate high radio frequency powers. The only limiting factors remaining are the capabilities of the circuitry and the basic thermal noise of the universe.

In order that the invention may be readily carried into effect, it will now be described with reference to the accompanying drawings, wherein.

Figure 1:
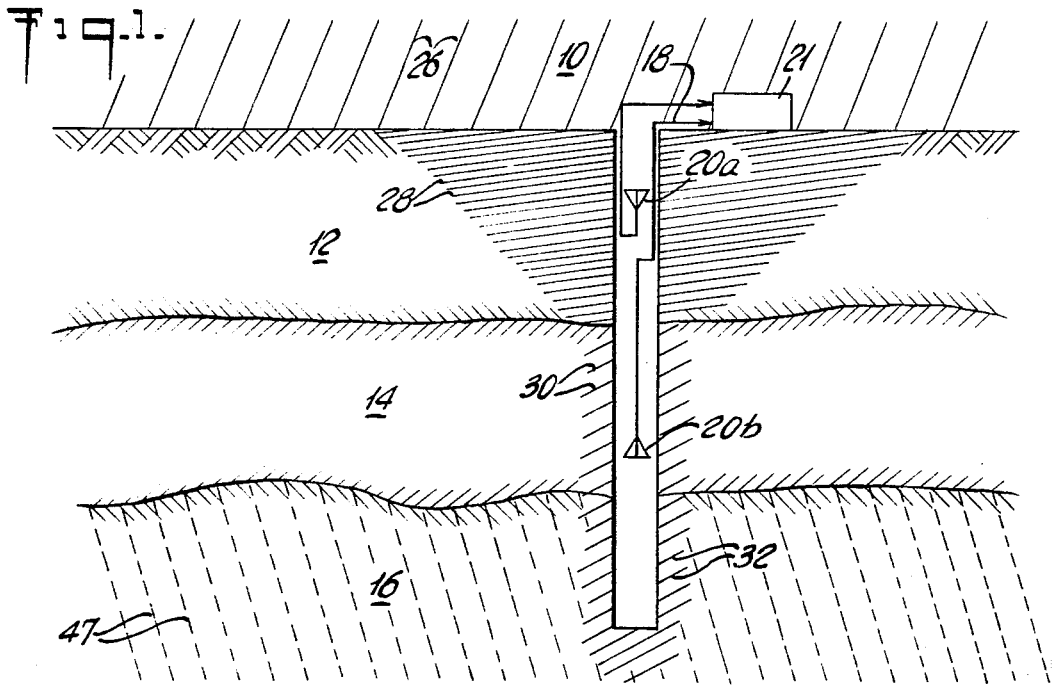
FIGURE 1 is a diagrammatic illustration of the atmosphere and a representative portion of the earth; showing the antenna placement within the earth and the effect of the earth on radio energy in the atmosphere.

In FIG. 1, the atmosphere is indicated schematically at 10 and the earth shown to comprise three distinct layers 12, 14 and 16, respectively, each of which has a different effect on the propagation of radio energy. A vertical bore hole 18 opens into the atmosphere and passes through earth layers 12 and 14 terminating within layer 16.

Two vertically displaced receiving antennas 20a and 20b are situated within hole 18. Antennas 20a and 20b may have directional characteristics if desired, but, in general, a common omni-directional antenna is preferred. The outputs of the two antennas are coupled to the electronic processing equipment 21, discussed below, wherein is located the electronic apparatus for comparing the received signals to determine the earth's characteristics.

The invention is predicated upon the discovery that when ambient radio energy or atmospheric noise, which is always present, is propagated across the surface of the earth, a certain amount of the energy will be refracted down into the earth and continue to propagate downwardly at an angle which is measured by the ratio of the signal wavelength in air to the wavelength in the earth. Since the wavelength in the earth is many times shorter than the wavelength in the air, the angle of refraction is almost vertically downward.

In FIG. 1, the phase front of these atmospheric signals are indicated schematically by a series of parallel lines 26 slanted slightly with respect to the vertical. According to the laws of propagation, these phase fronts must be continuous across the interface between the earth and the air. The wavelength of the signal in earth is governed by the physical constants of the earth, and in general is much shorter than the wavelength of the signal in air. Thus, the wave tends to propagate almost vertically downwardly as indicated by the parallel lines 28 within earth layer 12, the lines 28 being a continuation of the phase fronts 26 in the atmosphere 10.

Since the wavelength of the signal in the earth is determined by the conductivity, permeability and dielectric constant of the earth, it varies with the change in physical constants of layers 12, 14 and 16. Hence, as the waves continue downwardly, the wavelength will change as schematically shown by phase fronts 30 in layer 14 and wave fronts 32 of layer 16. The difference in spacing between the wave fronts 28, 30 and 32 indicates the change in wavelength as the signal is propagated through the earth.

Additionally, the wave will also be attenuated in an exponential or logarithmic fashion as it propagates through the earth. This is indicated diagrammatically by the tapering of the length of the respective phase front lines 28, 30, and 32 as the distance into the earth increases. The attenuation and change of wavelength are a measure of the conductivity of the earth which is also dependent upon the characteristics of the various geological formations present in the respective layers of the earth.

The individual phase fronts 26, 28, 30, and 32 can be considered to represent discrete equal increments of time moving from left to right above the surface and generally downwardly through the earth. These signals are received at antennas 20a and 20b at different times which may be related in increments of time to the number of lines between the two antennas. Thus, the outputs of the two antennas may be analyzed and compared over a wide range of frequencies to produce an equivalent circuit of the earth between the two receivers.

Figure 2:
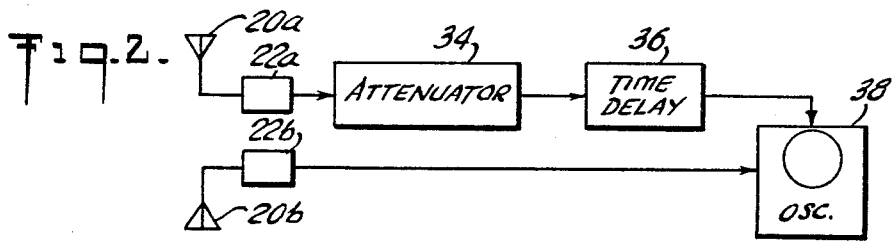
FIGURE 2 is a block diagram of a system for determining the physical constants of the earth.

A system for accomplishing this comparison (processing equipment 21) is schematically indicated in block diagram form in FIGURE 2. Antennas 20a and 20b are coupled to receivers 22a and 22b, respectively, which may be conventional wave analyzers having a narrow band output of, for example, five cycles bandwidth. The output of receiver 22a is coupled through a variable attenuator 34 and variable time delay 36 connected in series. Attenuator 34 may be a resistance network and time delay 36 may comprise a series of fixed LC circuits or ultrasonic delays lines. Time is measured instead of phase to prevent ambiguities which would occur in the case of phase comparisons. The output of receiver 22a, after it has been attenuated and delayed in time, is coupled along with the output of receiver 22b to a conventional oscilloscope 38 on which the two signals are displayed on a time basis.

Figure 3:
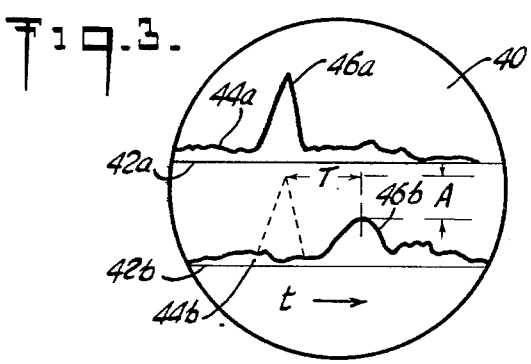
FIGURE 3 is an illustration of the face of an oscilloscope used in a preferred embodiment of the invention.

The display on oscilloscope 38 is indicated in FIGURE 3. It includes the visual face of a cathode ray tube 40 which includes two time scales 42a and 42b corresponding to the outputs or the signals received by antennas 20a and 20b, respectively. The ambient atmospheric noise received at the respective antennas is shown at 44a and 44b. When an unusual disturbance, such as a flash of lightning, occurs, it will be detected by antenna 20a to produce a relatively large spike 46a on the corresponding trace of the oscilloscope. The same energy burst, attenuated by the earth, will be detected by antenna 20b at a time delayed with respect to the receipt of the signal at antenna 20a, the attenuation and time delay being dependent upon the rate of change of signal amplitude and the physical constants of the earth between the two antennas.

The trace on the oscilloscope is sufficiently retentive so that the two signals may be compared to indicate the time delay T between the receipt of the signals at the respective antennas, and the attenuation A of the signal as it propagates through the ground. Thus, by comparing the respective traces, it is a simple matter to adjust attenuator 34 and time delay 36 to compensate for the phase delay and attenuation introduced by the earth at a given frequency. Once the frequency response of the received signals is known, it is a simple matter to fabricate an electrical circuit which will attenuate and delay radio energy over a given frequency band in the same manner as does the earth between the two antennas.

Figure 4:
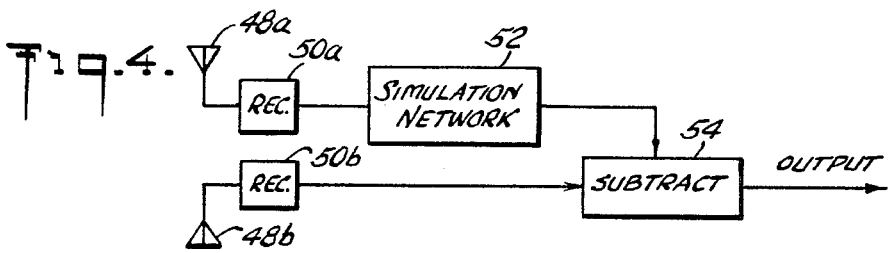
FIGURE 4 is a block diagram of an underground communications system showing a particular use of the invention.

A system for utilizing the information derived in accordance with the invention is illustrated in FIGURE 4. This system is designed to receive information propagated through the earth in an underground communication system. Referring again to FIG. 1, such information may be schematically illustrated to have wave front indicated by parallel lines 47, which, as illustrated, will propagate generally horizontally through the earth as opposed to the downward propagation of the refracted waves from the atmosphere. A pair of antennas 48a and 48b are located in a suitable hole such as 18 in the same manner as are antennas 20a and 20b. The antennas are associated with respective receivers 50a and 50b, the output of receiver 50a being coupled to a simulation network 52 which has been simulated in accordance with the description of FIGURES 2 and 3. The signals containing the information indicated by wave fronts 47 will not pass through the same path to the two antennas as do the signals from the atmosphere. When the output of receiver 50a is properly attenuated and delayed in time, the atmospheric noise received thereby will be indistinguishable from the noise received by receiver 50b. Thus, the output of network 52 and receiver 50b are coupled to a subtracting circuit 54 which subtracts the two signals so that the net result as far as the atmospheric noise is concerned, is essentially zero. The wave fronts 47, however, in traveling from antenna 48b to antenna 48a propagate over a path which is the inverse of the path of the refracted atmospheric signals through the earth. Thus, the information signals will have a normal attenuation due to the earth layers between the antennas, and will be additionally attenuated and delayed because of the simulation network 52 coupled to the output of receiver 50a. Thus, little or no cancellation of the information signals will occur in the subtracting circuit 54 and the net result will be to cancel out only the undesirable atmospheric disturbances.

The physical constants involved are in general fixed over only a very narrow frequency band and therefore are not really constants. The losses as well as the energy storage characteristics vary with frequency in a different manner for different propagating media. There also will be reflections of energy as the characteristics of the medium change, not only between antennas 20a and 20b (as from the interface between geological formations 12 and 14), but there will also be reflections from changes in the medium beyond antenna 20b such as from the interface between layers 14 and 16. These reflections may be from lateral and/or horizontal discontinuities and will manifest themselves as standing wave patterns in the earth which can be measured by moving antenna 20a and/or antenna 20b up and down the drill hole 18. Changes in the earth below the bottom of drill hole 18 or laterally beyond the normal influence of the medium will also manifest themselves as standing waves which can be measured as the frequency being investigated is varied. From this information it is possible to probe beyond antenna 20b and predict on the basis of measured data interpreted by established mathematical formulas many of the major changes in geological structure such as oil bearing formations, mineral deposits or other geophysical phenomena, and the depth or distance at which they will occur, without the necessity of physically penetrating to that depth, or at that specific locality.

It can be seen with reference to FIGURE 1 that there is no requirement for the arrival of signal energy to be related to any reference in time. Stated in another manner, the signal can be completely random. The only requirement is that a change in electromagnetic energy occurs containing spectral energy in the range of frequencies of interest.

It was previously stated that the phase fronts 26, 28, 30, and 32 can be considered to represent equal increments of time. It is possible, without contradicting the above, to remove this restriction. The only measurement which involves time is that which measures the time it takes for the signal to travel from antenna 20a to 20b. In other words, the phase shift of a specific frequency measured at antenna 20a with respect to 20b is constant for a specific path, and independent of the phase of its initial arrival at antenna 20a. Thus, time or phase has no meaning in any absolute sense; it has meaning only when measured with respect to the arrival of an electromagnetic event at antenna 20a. Thus, it can be seen that when the time and amplitude response characteristics of the simulation circuits are the same as that of the propagation medium between antennas 20a and 20b, any change in radio energy will manifest itself as simultaneous events at the outputs of the two receivers. This will be true without reference to any other change in radio energy in the past, present or future. Since sequential changes in radio energy need have no time correlation with each other, the input to the system can be completely random and the tremendous powers available from atmospheric disturbances can be used as a signal source from which coherent data can be derived.

The spectrum of interest will extend from below a few hundred cycles per second to above several million cycles per second. The separation between the receivers may vary from a few feet to several thousand feet and may in itself be either fixed or variable depending on the application of the invention.

An additional refinement of the invention would be to make the antennas involved with directional characteristics, and to allow both antennas to be rotated with respect to some absolute direction such as magnetic north, and with respect to each other. It was pointed out that standing wave patterns or alternate wave refraction paths could be generated within the earth by geological discontinuities, wherein the variation of the physical constants between or within formations provides an electromagnetic discontinuity. Under conditions such as this, the simulation of the medium involved would be expected to differ for signals arriving from different azimuthal directions at the second receiver. Thus, the direction as well as the distance of valuable oil or mineral deposits and other geophysical phenomena could also be determined.

The simulation device which reproduces the characteristics of the medium may be any of a variety of devices which will accomplish the desired objective. Thus, it may be an analog device which physically simulates the time delays, phase shifts and attenuation of the medium; it may be a digital device which takes the data from the two receivers, computes numerically and operates on the basis of a mathematical simulation; it may operate in the time domain with a correlation device such as a tapped ultrasonic delay line which physically simulates the medium by reproducing its transfer function or impulse response; and it may operate in the frequency domain wherein it operates with respect to the changing frequency response characteristics of the medium. The techniques involved are well known and on the basis of the present teachings, a person skilled in the art could make and use this invention by any of many well known techniques.

In summary, this invention resides in the discovery that signals propagating over the surface of the earth tend to propagate almost vertically downwardly upon entering the earth in such a manner that they can be exploited for unique and useful applications. The fact that they tend to propagate almost vertically downwardly implies that signals received well below the surface of the earth tend to follow the same general path through the earth regardless of their original point of origin above the surface. In so far as all paths are common, the signals are modified in a manner unique to the physical constants in and in the vicinity of the measurement points along the path. Thus if two antennas are placed along this path, the modifications of the signal received at the closest antenna, when measured with respect to the signal received at the other antenna are unique to the characteristics of the path and are independent of the direction or magnitude of the original signal source or initial characteristics. Knowing this to be true, it is then possible to operate on these signals with various devices. This is accomplished in such a manner that when the signals between the two receivers are indistinguishable, the device or technique used to produce this indistinguishability is a true, gross simulation of the propagation characteristics of the earth in the vicinity of the path between the two receivers. The physical constants of the propagation medium can be derived from this simulation. Since these physical constants are known to correlate with geological and lithological characteristics of valuable rocks and minerals, and mineral and petroleum bearing formations, the invention provides a useful means of geophysical exploration.

In so far as the signal paths between receivers may not be completely common, the invention allows cancellation of that portion of the signal which is common. This would provide a valuable aid in eliminating undesirable noise in communications through the earth. It would also allow the study of these uncommon signals and the characteristics of their propagation path or paths with additional receivers and simulation devices similar to the initial device.

Although a preferred embodiment of the invention has been shown and described, the invention is not so limited and should only be defined by the following claims.

What is claimed is:

1. A method of determining the physical properties of earth affecting the propagation of radio waves therethrough, said method comprising the steps of: receiving radio energy propagated above the surface of the earth and refracted substantially vertically downward into the earth at two different antennas within the earth, one antenna spaced from and substantially vertically below the other antenna; comparing the radio energy received by said one antenna with a radio energy received by said other antenna; and reproducing the electrical characteristics of the propagating path between said antennas in response to said comparing to simulate the physical properties of the earth between and in the vicinity of said antennas.

2. The method of claim 1 wherein the reproduction of said electrical characteristics includes at least one of the permeability, permittivity and resistivity factors of the earth within said propagating path.

3. A method of determining the physical properties of earth affecting the propagation of radio waves therethrough, said method comprising the steps of: receiving radio energy propagated above the surface of the earth and refracted substantially vertically downward into the earth at two different antennas within the earth, one antenna spaced from and substantially vertically below the other antenna; comparing the radio energy received by said one antenna with the radio energy received by said other antenna; and adjusting the form of the radio energy received by one of said antennas to obtain a predetermined comparison such that the adjustments made provide a measurement of the physical properties of the earth between and in the vicinity of said antennas.

4. The method of claim 3 including propagating the radio energy into the earth from a source above the surface of the earth.

5. The method of claim 3 including adjusting the form of the radio energy received by said one of said antennas over a frequency range of interest and compensating for the transit time and attenuation caused by the earth in the propagating path.

6. The method of claim 3 including the use of omnidirectional antennas and rotating said antennas with respect to some absolute direction and with respect to each other.

References Cited

UNITED STATES PATENTS

| 2,139,460 | 12/1938 | Potapenko | 324—6 X |
| 2,268,106 | 12/1941 | Blau | 324—6 |
| 2,992,325 | 7/1961 | Lehan | 324—6 X |
| 3,087,111 | 4/1963 | Lehan et al. | 324—7 X |
| 3,123,767 | 3/1964 | Ghose | 325—28 X |
| 3,125,717 | 3/1964 | Ghose | 324—9 X |

RUDOLPH V. ROLINEC, Primary Examiner.

G. R. STRECKER, Assistant Examiner.